US006987384B2

(12) United States Patent
Uehira et al.

(10) Patent No.: US 6,987,384 B2
(45) Date of Patent: Jan. 17, 2006

(54) DEVICE FOR DETECTING ROTATION ANGLE AND TORQUE

(75) Inventors: Kiyotaka Uehira, Osaka (JP); Koji Oike, Kyoto (JP); Masaharu Ushihara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/528,658

(22) PCT Filed: Aug. 31, 2004

(86) PCT No.: PCT/JP2004/012906

§ 371 (c)(1), (2), (4) Date: Mar. 22, 2005

(87) PCT Pub. No.: WO2005/024368

PCT Pub. Date: Mar. 17, 2005

(65) Prior Publication Data

US 2005/0258824 A1 Nov. 24, 2005

(30) Foreign Application Priority Data

Sep. 2, 2003 (JP) ............................ 2003-309795

(51) Int. Cl.
*G01B 7/30* (2006.01)

(52) U.S. Cl. .............................. 324/207.25; 73/514.39

(58) Field of Classification Search ................ 324/173, 324/174, 207.11–207.13, 207.15–207.25; 73/514.16, 514.31, 514.39

See application file for complete search history.

(56) References Cited

U.S. PATENT DOCUMENTS

| | | | | |
|---|---|---|---|---|
| 6,301,975 | B1 | 10/2001 | Chikaraishi | |
| 6,578,437 | B1 | 6/2003 | Moerbe | |
| 6,720,762 | B2 * | 4/2004 | Okumura | 324/207.21 |
| 6,880,254 | B2 * | 4/2005 | Uehira et al. | 33/1 PT |

FOREIGN PATENT DOCUMENTS

| | | |
|---|---|---|
| DE | 40 28 246 | 3/1992 |
| JP | 60-58950 | 4/1985 |
| JP | 3307317 | 5/2002 |
| WO | 00/08434 | 2/2000 |
| WO | 03/106953 | 12/2003 |

* cited by examiner

*Primary Examiner*—Bot LeDynh
(74) *Attorney, Agent, or Firm*—Wenderoth, Lind & Ponack, L.L.P.

(57) ABSTRACT

A detector of a rotation angle and torque is disclosed. First gear (1) and second gear (2) are coupled to input shaft (4) and output shaft (6) of a torsion-bar unit respectively. First magnet (20*a*) magnetized in a radius direction is rigidly mounted to first rotor (10) engaging with first gear (1). Second magnet (20*b*) magnetized in a radius direction is rigidly mounted to second rotor (16) engaging with second gear (3). Circuit board (15) is placed between first rotor (10) and second rotor (16). Circuit board (15) includes first magnetism detecting element (21*a*) on its first face confronting the first magnet (20*a*), and also includes second magnetism detecting element (21*b*) on its second face confronting the second magnet (20*b*).

10 Claims, 6 Drawing Sheets

FIG. 7 – PRIOR ART
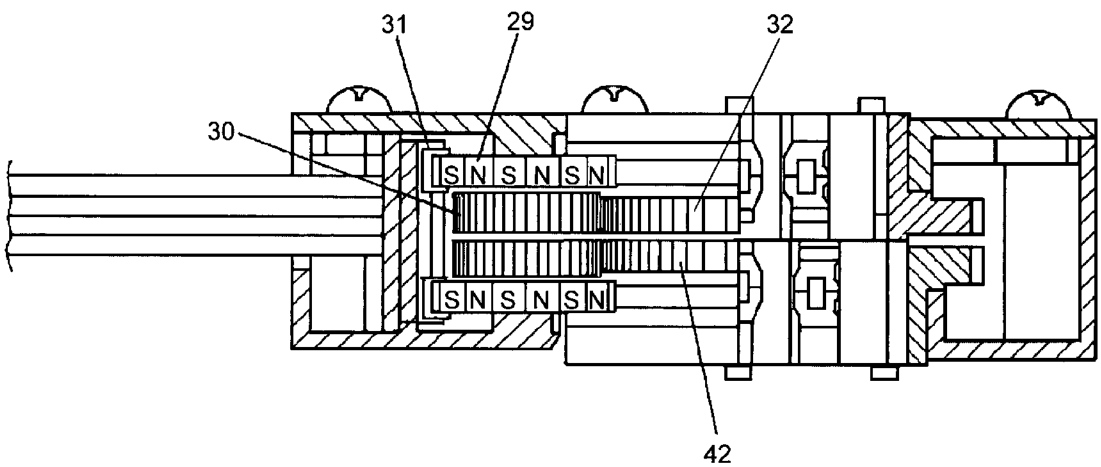

DEVICE FOR DETECTING ROTATION ANGLE AND TORQUE

This application is a U.S. national phase application of PCT International Application PCT/JP2004/012906.

TECHNICAL FIELD

The present invention relates to a detector, mounted to a torsion bar, for detecting a rotation angle and torque simultaneously. The detector of the present invention is used in a power steering of cars.

BACKGROUND ART

FIG. 7 shows a conventional detector of a rotation angle and torque. Gear 32 is mounted to an input shaft (not shown) of a torsion bar. Gear 30 engaging with gear 32 includes circular-shaped code plate 29 having numbers of magnetic poles. Rotation of the input shaft entails code plate 29 to rotate. Magnetism detecting element 31 counts the number of magnetic poles rotating, thereby detecting a rotation angle of the input shaft. Gear 42 is mounted to an output shaft (not shown) of the torsion bar, and a rotation angle of the output shaft is detected in the same manner discussed above. When torque works to the torsion bar to produce torsion, comparison of the rotation angles between the input shaft and the output shaft will detect torque.

However, obtaining a more accurate rotation angle requires code plate 29 to have more numbers of magnetic poles, so that the detector becomes bulky. Placement of magnetism detecting element 31 on code plate 29 along the radial direction also enlarges the detector.

DISCLOSURE OF THE INVENTION

A detector of a rotation angle and torque of the present invention comprises the following elements:

- a first and a second gears;
- a first and a second rotors engaging with the first and the second gears respectively;
- a first and a second magnets rigidly mounted at the centers of the first and the second rotors respectively;
- a circuit board disposed between the first and the second rotors;
- a first magnetism detecting element disposed on a first face of the circuit board at a place confronting the first magnet;
- a second magnetism detecting element disposed on a second face of the circuit board at a place confronting the second magnet; and
- a housing accommodating the foregoing structural elements

BRIEF DESCRIPTION OF THE DRAWINGS

FIG. 7 shows a conventional detector of a rotation angle and torque.

DETAILED DESCRIPTION OF PREFERRED EMBODIMENTS

Exemplary embodiments of the present invention are demonstrated hereinafter with reference to the accompanying drawings.

Exemplary Embodiment 1

Figure 1A:
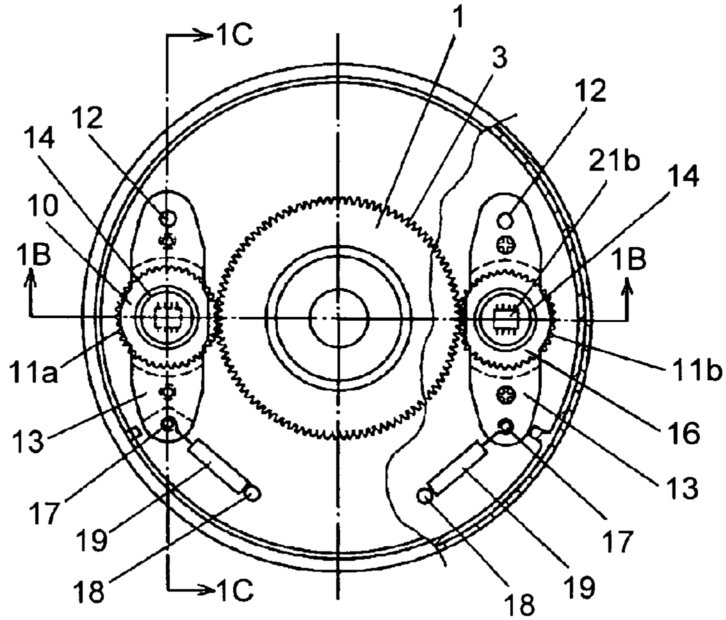
FIG. 1A shows a top view of a detector in accordance with a first exemplary embodiment of the present invention.
Figure 1C:
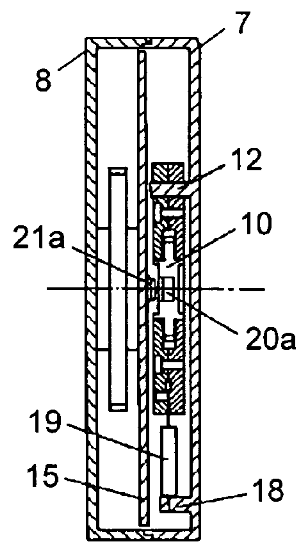
FIG. 1C shows a lateral sectional view of the detector shown in FIG. 1.
Figure 1B:
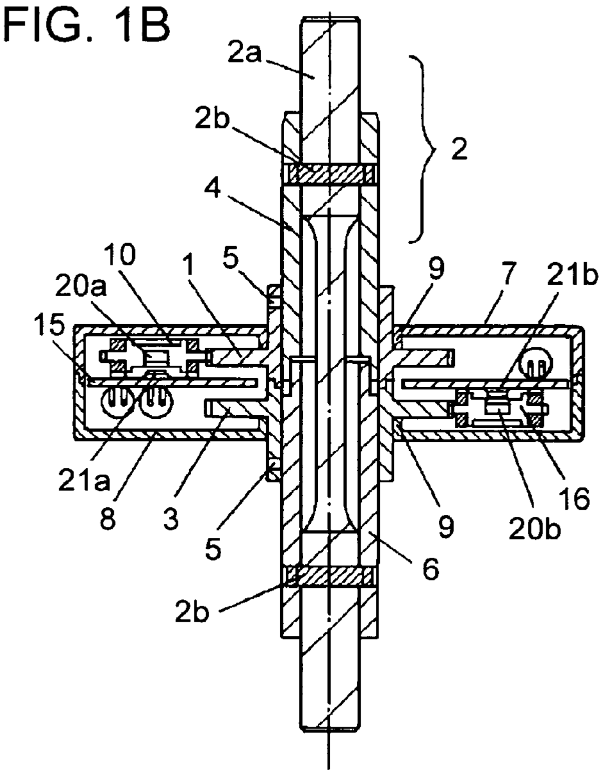
FIG. 1B shows a front sectional view of the detector shown in FIG. 1.

FIGS. 1A, 1B and 1C show a top view, a front sectional view, and a lateral sectional view of a detector of a rotation angle and torque of the present invention.

First gear 1 is fixed to input shaft 4 of torsion-bar unit 2 with screw 5. Second gear 3 is fixed to output shaft 6 of torsion-bar unit 2 with screw 5. A lower end of first gear 1 engages loosely with an upper end of second gear 3. First gear 1 and second gear 3 are supported respectively by bearing 9 equipped to upper housing 7 and lower housing 8, and accommodated in housings 7 and 8.

Input shaft 4 is fixed to an upper end of torsion bar 2*a* with spring-pin 2*b*, and output shaft 6 is fixed to a lower end of torsion bar 2*a* with spring-pin 2*b*. A lower end of input shaft 4 engages loosely with an upper end of output shaft 6.

Transmission of torque through torsion-bar unit 2 twists torsion bar 2*a*, so that a difference in rotation angles between input shaft 4 and output shaft 6 is produced.

First gear 1 engages with gear 11*a* of first rotor 10, which is supported by bearing 14 of arm 13 mounted to upper housing 7 such that arm 13 can rotate on pivot 12. Spring 19 has tensile force working on tip 17 of arm 13 and urging first rotor 10 mounted on arm 13 against first gear 1, so that backlash of the gear can be reduced.

Second gear 3 engages with gear 11*b* of second rotor 16, which is disposed opposite to first rotor 10 with circuit board 15 in between, and is mounted on an arm in lower housing 8. This arm has the same construction as arm 13.

First rotor 10 and second rotor 16 include first magnet 20*a* and second magnet 20*b* fixed at their centers respectively, and each one of the magnets has a magnetic field along the radial direction of the rotor. Both of magnets 20*a* and 20*b* are magnetized in one pole pair. Circuit board 15 is disposed between first rotor 10 and second rotor 16, and board 15 has first magnetism detecting element 21*a* on its first face so that element 21*a* confronts first magnet 20*a*. Board 15 also has second magnetism detecting element 21*b* on its second face so that element 21*b* confronts second magnet 20*b*.

Since circuit board 15 is equipped with first magnetism detecting element 21*a* and second one 21*b* on its both sides, so that board 15 can be accommodated in a compact space between upper and lower housings 7, 8. This construction is thus effective to downsize the detector.

Figure 2:
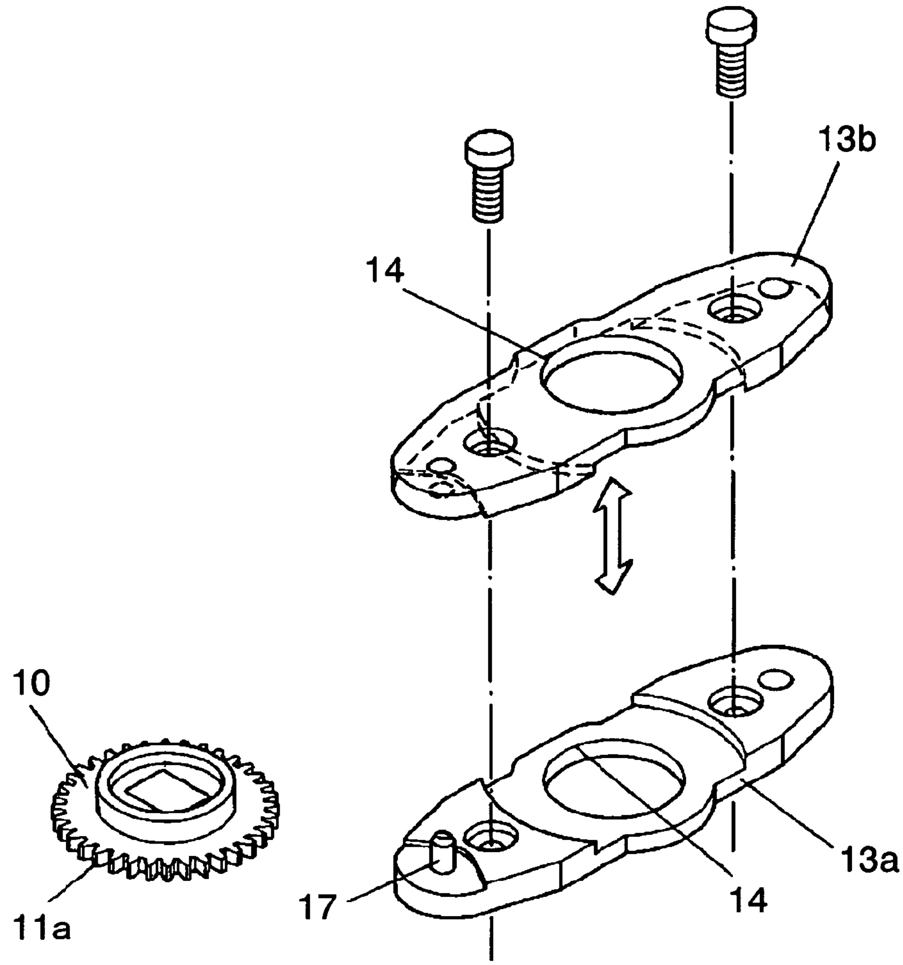
FIG. 2 shows a perspective exploded view illustrating a structure of an arm of the detector shown in FIG. 1.

FIG. 2 shows an exploded view of arm 13. First rotor 10 having gear 11*a* is rotatably supported by bearing 14 between lower arm 13*a* and upper arm 13*b*. As previously discussed, second rotor 16 having gear 11*b* is integrated into the arm which has the same construction as arm 13.

In FIG. 1B, first magnetism detecting element 21*a* detects a change in the magnetic field of first magnet 20*a*, so that a rotation angle of first rotor 10 can be detected. In a similar manner, second magnetism detecting element 21*b* detects a change in the magnetic field of second magnet 20*b*, so that a rotation angle of second rotor 16 can be detected.

Appropriate setting of the number of teeth of first gear 1, second gear 3, gear 11*a* of first rotor 10, and gear 11*b* of second rotor 16 allows producing a relative change in respective rotation angles of first rotor 10 and second rotor 16. This preparation thus allows detecting a rotation angle (absolute angle of multi-rotations) even if the rotation angle of input shaft 4 exceeds one rotation (360 degrees).

When torsion bar 2*a* is twisted, and a relative angle change in the rotation angle occurs between input shaft 4 and output shaft 6, the change amount in rotation is proportionate to torque working on torsion bar 2*a*. Thus removal of a detection signal of an absolute rotation angle from detection signals supplied from first and second detecting elements 21*a* and 21*b* will find the torque working between the input and output shafts.

In general, a change amount due to torsion in rotation of torsion bar 2*a* is as little as not more than 3 degrees, so that an engagement accuracy of teeth of gears becomes critical for improving a detection accuracy of detectors. As shown in FIG. 1A, the detector of the present invention employs elastic member 19, e.g. a spring, and this spring urges first rotor 10 (or second rotor 16) against first gear 1 (or second gear 3), thereby reducing an error accompanying backlash of the gear.

As shown in FIG. 2, arm 13 supports first rotor 10 (or second rotor 16) with bearings on both the sides of the rotor, so that the force of elastic member 19 works on the teeth faces of first gear 1 (or second gear 3) at right angles. As a result, an error due to a slant of the gear can be prevented.

A power steering device of cars uses the detector of the present invention, so that a rotation angle (absolute angle) and torque produced by operating the steering can be detected simultaneously with high accuracy, and the detector can be in a compact structure,

Exemplary Embodiment 2

Figure 3:
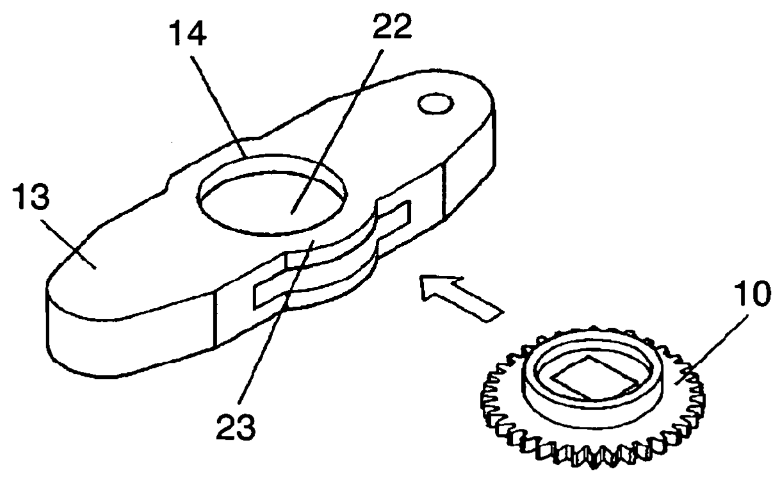
FIG. 3 shows a perspective exploded view illustrating a structure of an arm.

FIG. 3 shows an exemplary embodiment of an arm of the detector of the present invention. Similar elements to the previous embodiment have the same reference marks and the descriptions thereof are omitted here. Arm 13 is formed from resin in one body and has space 22 as well as bearing 14 at its center for accommodating and supporting first rotor 10. Thin-based section 23 is formed around bearing 14. Since thin-based section 23 can be transformed against the elasticity of the resin for accommodating first rotor 10 in arm 13, the construction of arm 13 of this second embodiment becomes so simple that arm 13 can be assembled in a short time.

Figure 4:
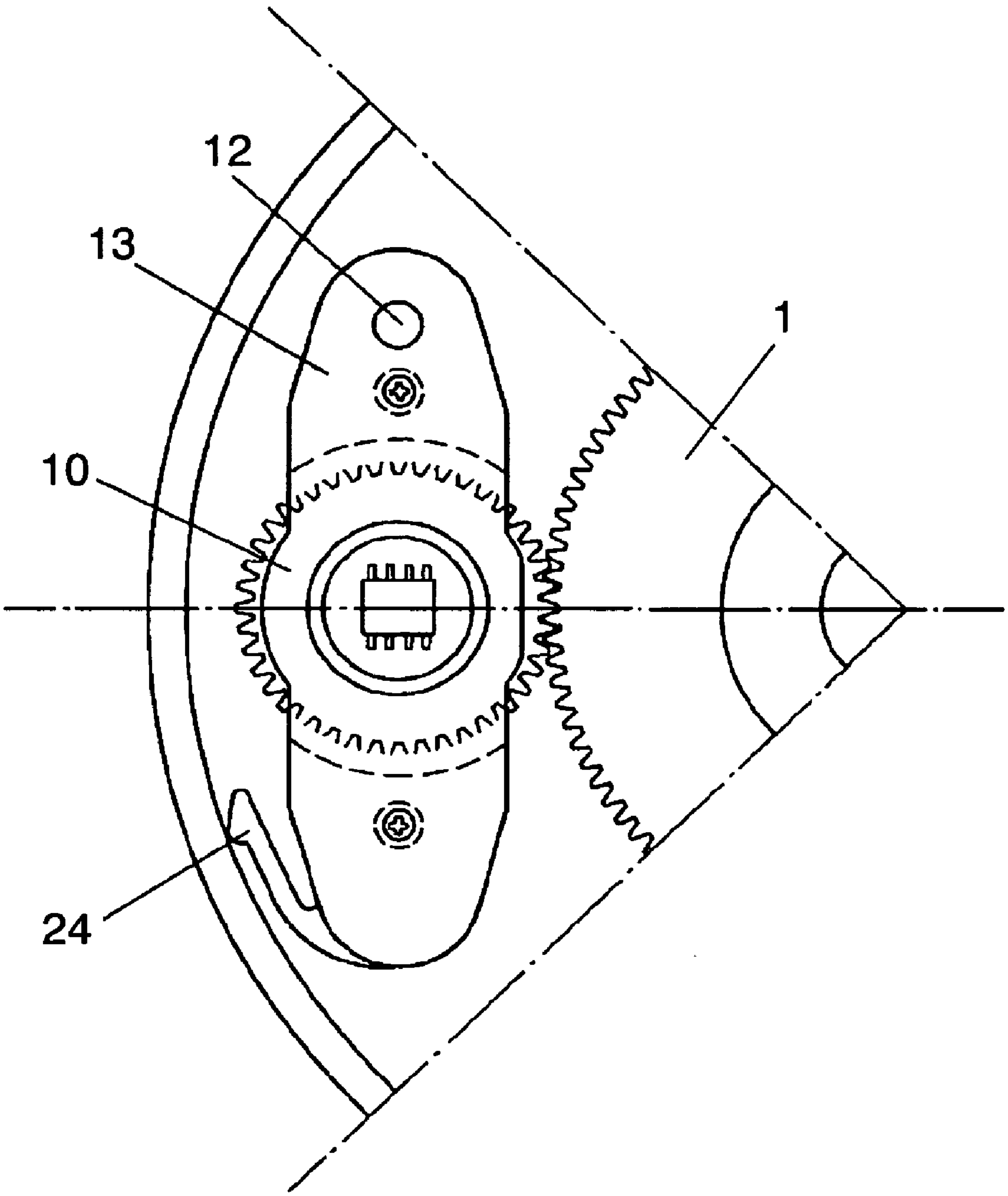
FIG. 4 shows a plan view illustrating a structure of another arm.

FIG. 4 shows another embodiment of the arm, for instance, arm 13 made from polyacetal resin has elastic slip 24 integrated therein. Elastic slip 24 urges first rotor 10, mounted to arm 13 which can rotate around pivot 12, against first gear 1, thereby reducing an error accompanying backlash of the gear.

Figure 5A:
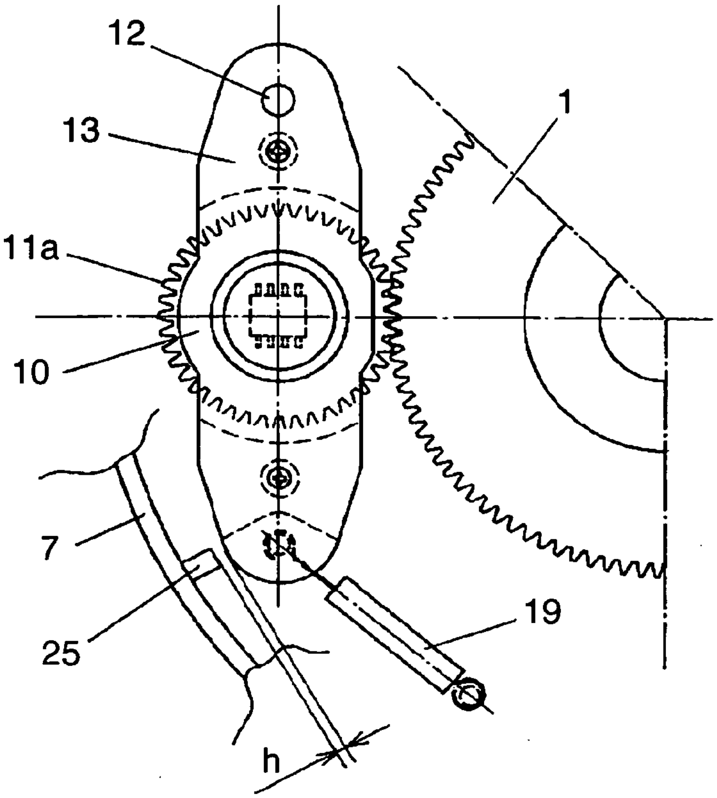
FIG. 5A shows a plan view of an arm stopper.
Figure 5B:
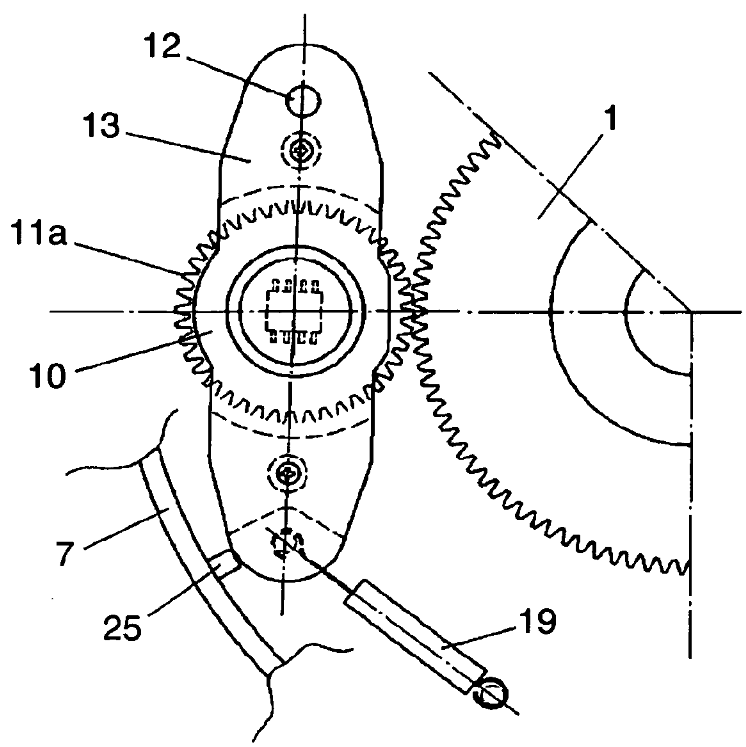
FIG. 5B shows a plan view of an arm brought into contact with the arm stopper.

FIGS. 5A and 5B shows still another embodiment of the arm. Arm stopper 25 is formed on an inner face of upper case 7 near a tip of arm 13. Space h (FIG. 5A) between arm stopper 25 and arm 13 is smaller than an intermeshing amount between gear 11*a* of first rotor 10 and first gear 1. Thus even if arm 13 is moved by, e.g. vibrations, arm stopper 25 stops the move (FIG. 25), so that the intermesh between gears is not come out. This structure allows preventing first magnet 20*a* of first rotor 10 from deviating from the rotating position initially set, thereby avoiding an accident. As a result, the reliability of the detector can be improved.

Exemplary Embodiment 3

Figure 6A:
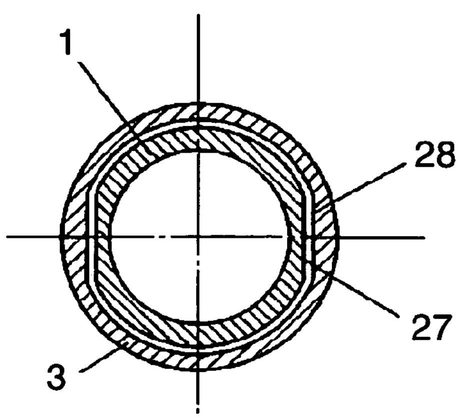
FIG. 6A shows a sectional view illustrating a loose engagement between a first gear and a second gear.
Figure 6B:
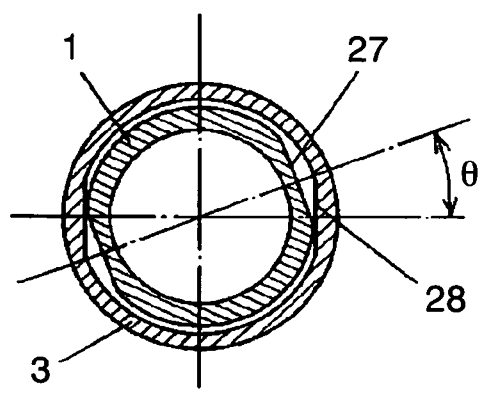
FIG. 6B shows a sectional view illustrating a rotation stopper disposed between a first gear and a second gear.

As previously discussed, the lower end of first gear 1 loosely engages with the upper end of second gear 3 (ref. FIG. 1C). FIG. 6A shows a sectional view of this loose engagement. As shown in FIG. 6B, rotation of first gear 1 with respect to second gear 3 causes a collision between these two gears at angle θ, thereby stopping the rotation. In other words, a shape of the loose engagement viewed from the sectional view constructs a rotation stopper which limits the rotation of first gear 1 and second gear 3 within a predetermined angle. The rotation stopper prevents torsion bar 2*a* from being twisted excessively. The rotation stopper is not limited to a shape shown in FIG. 6, and any shape as long as it can limit a relative rotation between input shaft 4 and output shaft 6 within a predetermined angle, it can produce a similar advantage to what is discussed above.

INDUSTRIAL APPLICABILITY

The present invention provides a detector of a rotation angle and torque. This detector is suited to a power steering of cars.

What is claimed is:

1. A detector of a rotation angle and torque, the detector comprising:
- a firsts gear;
- a first rotor including a gear engaging with the first gear;
- a first magnet rigidly mounted to a center of the first rotor;
- a second gear;
- a second rotor including a gear engaging with the second gear;
- a second magnet rigidly mounted to a center of the second rotor;
- a circuit board disposed between the first rotor and the second rotor;
- a first magnetism detecting element disposed on a first face of the circuit board at a place confronting the first magnet;
- a second magnetism detecting element disposed on a second face of the circuit board at a place confronting the second magnet; and
- a housing accommodating the foregoing structural elements.

2. The detector of claim 1 further comprising:
- an arm including a bearing which supports the first rotor, and
- an elastic body which urges the arm,
- wherein the elastic body urges the arm, so that the first rotor is urged against the first gear.

3. The detector of claim 1 further comprising:
- an arm including a bearing which supports the second rotor,
- an elastic body which urges the arm,
- wherein the elastic body urges the arm, so that the second rotor is urged against the second gear.

4. The detector of claim 2, wherein the arm has a thin-based section molded from resin around the bearing.

5. The detector of claim 2, wherein the elastic body is molded from resin integrally with the arm.

6. The detector of claim 2 further comprising an arm stopper for limiting a movement of the arm, wherein the arm stopper limits the arm to move within a smaller area than dimensions of an intermeshing between the first gear and the gear of the first rotor.

7. The detector of claim 3 further comprising an arm stopper for limiting a movement of the arm, wherein the arm stopper limits the arm to move within a smaller area than dimensions of an intermeshing between the second gear and the gear of the second rotor.

8. The detector of claim 1, wherein includes a pair of rotation stoppers, and each part of the pair disposed on respective end faces confronting each other of the first gear and the second gear.

9. The detector of claim 3, wherein the arm has a thin-based section molded from resin around the bearing.

10. The detector of claim 3, wherein the elastic body is molded from resin integrally with the arm.

* * * * *